(12) United States Patent
Nilsson

(10) Patent No.: US 9,167,257 B2
(45) Date of Patent: Oct. 20, 2015

(54) VIDEO CODING

(75) Inventor: Michael E Nilsson, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 426 days.

(21) Appl. No.: 12/921,538

(22) PCT Filed: Feb. 27, 2009

(86) PCT No.: PCT/GB2009/000543
§ 371 (c)(1),
(2), (4) Date: Sep. 8, 2010

(87) PCT Pub. No.: WO2009/112801
PCT Pub. Date: Sep. 17, 2009

(65) Prior Publication Data
US 2011/0019738 A1    Jan. 27, 2011

(30) Foreign Application Priority Data
Mar. 11, 2008    (EP) .................................... 08250815

(51) Int. Cl.
*H04N 7/26*    (2006.01)
*H04N 19/17*    (2014.01)
*H04N 19/61*    (2014.01)
(Continued)

(52) U.S. Cl.
CPC ............. *H04N 19/17* (2014.11); *H04N 19/124* (2014.11); *H04N 19/154* (2014.11); *H04N 19/61* (2014.11)

(58) Field of Classification Search
CPC ..... H04N 19/61; H04N 19/17; H04N 19/154; H04N 19/124
USPC ............................................ 375/240; 345/55
See application file for complete search history.

(56) References Cited

U.S. PATENT DOCUMENTS

| 4,419,699 A | 12/1983 | Christopher et al. |
| 5,025,458 A | 6/1991 | Casper et al. |
| 5,430,485 A | 7/1995 | Lankford et al. |

(Continued)

FOREIGN PATENT DOCUMENTS

| CN | 1426235 | 6/2003 |
| CN | 1714577 A | 12/2005 |

(Continued)

OTHER PUBLICATIONS

U.S. Appl. No. 13/133,757, filed Jun. 9, 2011.

(Continued)

*Primary Examiner* — William C Vaughn, Jr.
*Assistant Examiner* — Naod Belai
(74) *Attorney, Agent, or Firm* — Nixon & Vanderhye P.C.

(57) ABSTRACT

Pictures are coded using a coding algorithm with a variable parameter QP so that the quality of the coding varies. First (100), a target value $T_{iMOS}$ is specified for a quality measurement parameter. Then, for each picture (or part of a picture) to be coded, one estimates, independently of the other pictures, a value for the variable parameter QP based on a) the target value for that picture area and b) a masking measure C that depends on the picture content of that picture area. The picture is then coded (112) using the estimated value. The masking measure may be compensated (108, 122) to allow for the effect of the coding quality upon the masking effect.

21 Claims, 4 Drawing Sheets

(51) Int. Cl.
*H04N 19/124* (2014.01)
*H04N 19/154* (2014.01)

(56) References Cited

U.S. PATENT DOCUMENTS

| | | | |
|---|---|---|---|
| 5,534,937 A | 7/1996 | Zhu et al. | |
| 5,598,352 A | 1/1997 | Rosenau et al. | |
| 5,612,900 A | 3/1997 | Azadegan et al. | |
| 5,640,208 A | 6/1997 | Fujinami | |
| 5,768,527 A | 6/1998 | Zhu et al. | |
| 5,874,997 A | 2/1999 | Haigh | |
| 5,923,655 A | 7/1999 | Veschi et al. | |
| 5,949,410 A | 9/1999 | Fung | |
| 5,953,350 A | 9/1999 | Higgins | |
| 5,991,811 A | 11/1999 | Ueno et al. | |
| 6,002,440 A | 12/1999 | Dalby et al. | |
| 6,014,694 A | 1/2000 | Aharoni et al. | |
| 6,016,307 A | 1/2000 | Kaplan et al. | |
| 6,085,221 A | 7/2000 | Graf | |
| 6,097,757 A | 8/2000 | Boice et al. | |
| 6,101,221 A | 8/2000 | Varanasi et al. | |
| 6,130,987 A | 10/2000 | Tanaka | |
| 6,148,135 A | 11/2000 | Suzuki | |
| 6,169,843 B1 | 1/2001 | Lenihan et al. | |
| 6,195,368 B1 | 2/2001 | Gratacap | |
| 6,223,211 B1 | 4/2001 | Hamilton et al. | |
| 6,259,733 B1 | 7/2001 | Kaye et al. | |
| 6,332,157 B1 | 12/2001 | Mighdoll et al. | |
| 6,366,614 B1 | 4/2002 | Pian et al. | |
| 6,366,705 B1 | 4/2002 | Chiu et al. | |
| 6,381,254 B1 | 4/2002 | Mori et al. | |
| 6,397,251 B1 | 5/2002 | Graf | |
| 6,438,317 B1 | 8/2002 | Imahashi et al. | |
| 6,452,922 B1 | 9/2002 | Ho | |
| 6,453,112 B2 | 9/2002 | Imahashi et al. | |
| 6,502,125 B1 | 12/2002 | Kenner et al. | |
| 6,522,693 B1 | 2/2003 | Lu et al. | |
| 6,529,631 B1 | 3/2003 | Peterson et al. | |
| 6,560,334 B1 | 5/2003 | Mullaney et al. | |
| 6,678,332 B1 | 1/2004 | Gardere et al. | |
| 6,704,288 B1 | 3/2004 | Dziekan et al. | |
| 6,771,703 B1 | 8/2004 | Oguz et al. | |
| 6,792,047 B1 | 9/2004 | Bixby et al. | |
| 6,931,071 B2 | 8/2005 | Haddad et al. | |
| 6,937,770 B1 | 8/2005 | Oguz et al. | |
| 6,976,208 B1 | 12/2005 | Kim et al. | |
| 7,016,970 B2 | 3/2006 | Harumoto et al. | |
| 7,062,088 B1 | 6/2006 | Clauson | |
| 7,082,167 B2 * | 7/2006 | Alexandre et al. | 375/240.26 |
| 7,096,481 B1 | 8/2006 | Forecast et al. | |
| 7,111,061 B2 | 9/2006 | Leighton et al. | |
| 7,319,673 B1 | 1/2008 | Briscoe et al. | |
| 7,328,150 B2 | 2/2008 | Chen et al. | |
| 7,333,721 B2 | 2/2008 | Maehashi et al. | |
| 7,340,505 B2 | 3/2008 | Lisiecki et al. | |
| 7,430,329 B1 | 9/2008 | Sarna | |
| 7,471,874 B2 | 12/2008 | Kanemaru et al. | |
| 7,558,869 B2 | 7/2009 | Leon et al. | |
| 7,620,137 B2 | 11/2009 | Lottis et al. | |
| 7,676,107 B2 | 3/2010 | Gordon | |
| 7,760,801 B2 | 7/2010 | Ghanbari et al. | |
| 8,064,470 B2 | 11/2011 | Alvarez Arevalo et al. | |
| 8,125,901 B2 | 2/2012 | Appleby et al. | |
| 8,218,443 B2 | 7/2012 | Turnbull et al. | |
| 2001/0025308 A1 | 9/2001 | Jinushi et al. | |
| 2002/0031120 A1 | 3/2002 | Rakib | |
| 2002/0090027 A1 | 7/2002 | Karczewicz et al. | |
| 2002/0100052 A1 | 7/2002 | Daniels | |
| 2002/0102978 A1 | 8/2002 | Yahagi | |
| 2002/0136205 A1 | 9/2002 | Sasaki | |
| 2002/0181584 A1 * | 12/2002 | Alexandre et al. | 375/240.03 |
| 2003/0002482 A1 | 1/2003 | Kubler et al. | |
| 2003/0053416 A1 | 3/2003 | Ribas-Corbera et al. | |
| 2003/0145007 A1 | 7/2003 | Kenner et al. | |
| 2003/0169777 A1 | 9/2003 | Fuse | |
| 2003/0233666 A1 | 12/2003 | Onomatsu et al. | |
| 2004/0098748 A1 | 5/2004 | Bo et al. | |
| 2004/0141731 A1 | 7/2004 | Ishioka et al. | |
| 2005/0021830 A1 | 1/2005 | Urzaiz et al. | |
| 2005/0028133 A1 | 2/2005 | Ananth et al. | |
| 2005/0071876 A1 | 3/2005 | Van Beek | |
| 2005/0117891 A1 | 6/2005 | Suzuki | |
| 2005/0175251 A1 | 8/2005 | Taketa et al. | |
| 2005/0286422 A1 | 12/2005 | Funato | |
| 2005/0286488 A1 | 12/2005 | Briscoe et al. | |
| 2005/0286631 A1 * | 12/2005 | Wu et al. | 375/240.12 |
| 2006/0067362 A1 | 3/2006 | Ramakrishnan | |
| 2006/0092836 A1 | 5/2006 | Kwan et al. | |
| 2006/0120290 A1 | 6/2006 | Della Torre et al. | |
| 2006/0224762 A1 | 10/2006 | Tian et al. | |
| 2006/0238445 A1 * | 10/2006 | Wang et al. | 345/55 |
| 2007/0009045 A1 | 1/2007 | Mohandas | |
| 2008/0225728 A1 | 9/2008 | Plamondon | |
| 2008/0304413 A1 | 12/2008 | Briscoe et al. | |
| 2009/0074084 A1 | 3/2009 | Drezner et al. | |
| 2009/0086816 A1 * | 4/2009 | Leontaris et al. | 375/240.03 |
| 2010/0002951 A1 * | 1/2010 | Zhai et al. | 382/266 |
| 2010/0034272 A1 * | 2/2010 | Miyazaki et al. | 375/240.16 |
| 2010/0061446 A1 | 3/2010 | Hands et al. | |
| 2010/0157121 A1 | 6/2010 | Tay | |
| 2011/0019738 A1 | 1/2011 | Nilsson et al. | |
| 2011/0243223 A1 | 10/2011 | Nilsson et al. | |
| 2011/0292801 A1 | 12/2011 | Turnbull et al. | |

FOREIGN PATENT DOCUMENTS

| | | |
|---|---|---|
| DE | 10125017 A1 | 12/2002 |
| EP | 0 703 711 | 3/1996 |
| EP | 0817488 A2 | 1/1998 |
| EP | 0868084 A1 | 9/1998 |
| EP | 0966175 A2 | 12/1999 |
| EP | 1 296 479 | 3/2003 |
| EP | 1 919 220 | 5/2008 |
| WO | WO 95/22233 | 8/1995 |
| WO | 96/35999 | 11/1996 |
| WO | 98/26604 | 6/1998 |
| WO | 99/05602 | 7/1998 |
| WO | WO 99/65026 | 12/1999 |
| WO | WO 01/89142 A2 | 11/2001 |
| WO | 02/49343 A1 | 6/2002 |
| WO | WO 02/49343 A1 | 6/2002 |
| WO | WO 02/095637 A2 | 11/2002 |
| WO | 03/084172 A1 | 10/2003 |
| WO | 2004/047455 | 6/2004 |
| WO | 2004/054274 | 6/2004 |
| WO | WO 2004/054274 | 6/2004 |
| WO | 2006/099082 | 9/2006 |
| WO | 2008/081185 | 7/2008 |
| WO | 2008/119954 | 10/2008 |
| WO | 2010/092323 | 8/2010 |

OTHER PUBLICATIONS

"Differentiated End-to-End Internet Services using a Weighted Proportional Fair Sharing TCP", by Crowcroft and Oechslin, ACM SIGCOMM, vol. 28, pp. 53-69, Jul. 1998.

"Multiple bitstream switching for video streaming in monotonically decreasing rate schedules", by Alam, Khan and Ghanbari IEEE International Conference on Industrial Technology 2006, Dec. 15-17, 2006, pp. 973-978.

Methodology for the subjective assessment of the quality of television pictures, International Telecommunications Union recommendation B.T.500-11, 2002 (48 pgs.).

Mulroy, P. et al.. "The Use of MULTCP for the Delivery of Equitable Quality Video", BT Innovate, Broadband Applications Research Centre, Ipswich, UK, 2009 (9 pgs.).

Crabtree, B. et al., "Equitable Quality Video Streaming", Consumer Communications and Networking Conference, 2009, (Jan. 10, 2009), pp. 1-5.

International Search Report (3 pgs.) dated Nov. 17, 2010 issued in International Application No. PCT/GB2010/000217.

International Search Report for PCT/GB2009/002827, mailed Apr. 9, 2010.

(56) References Cited

OTHER PUBLICATIONS

International Search Report for PCT/GB2008/000010, mailed Jul. 8, 2008.
Written Opinion for PCT/GB2008/000010, mailed Jul. 8, 2008.
H.264/AVC, EBU Technical Review, Jan. 2003, R. Schafer, T. Wiegand, and H. Schwarz, available from: http://www.ebu.ch/en/technical/trev/trev_293-schaefer.pdf.
Office Action (14 pgs.) dated Jan. 28, 2014 issued in co-pending U.S. Appl. No. 13/133,757.
U.S. Appl. No. 12/522,121, filed Jul. 2, 2009.
Office Action (14 pgs.) dated Jul. 25, 2014 issued in co-pending U.S. Appl. No. 13/201,261.
International Search Report for PCT/GB2009/000543, mailed May 8, 2009.
Guojun Lu et al, "An Efficient Communication Scheme for Media On-Demand Services with Hard QoS Guarantees", Journal of Network and Computer Applications, 'Online!, vol. 21, No. 1, Jan. 19998, pp. 1-15, XP002328926.
Yeom et al, "An Efficient Transmission Mechanism for Stored Video", Protocols for Multimedia Systems—Multimedia Networking, 1997, Proceedings, IEEE Conference on Santiago, Chile Nov. 24-27, 1997, Los Alamitos, CA, USA, IEEE Comput. Soc., US, Nov. 24, 1997, pp. 122-130, XP010258820.
McManus et al., "Video-On-Demand Over ATM: Constant-Rate Transmission and Transport", IEEE Journal on Selected Areas in Communications, IEEE Inc., New York, US, vol. 14, No. 6, Aug. 1, 1996, pp. 1087-1098, XP000608049.
International Search Report re PCT/GB2004/001253 mailed Sep. 15, 2004 (search conducted Sep. 8, 2004).
Hwang, et al., "ITU-T Recommendation H.261 Video Coder-Decoder," 1997, Digital Consumer Electronics Handbook, XX, XX, pp. 1001-1026, I, XP001059410.
Anastasiadis, et al., "Server-Based Smoothing of Variable Bit-Rate Streams," ACM Multimedia, 2001, pp. 147-158.
Zimmermann, et al., "A Multi-Threshold Online Smoothing Technique for Variable Rate Multimedia Streams," (Abstract only—paper is not due to be published until 2006) at http://idefix.usc.edu/pubs/mtfc.html.
Mohan, et al., "Adapting Multimedia Internet Content for Universal Access," IEEE Transactions on Multimedia, vol. 1, No. 1, Mar. 1999, pp. 104-114.
Makaroff, et al., "An Evaluation of VBR Disk Admission Algorithms for Continuous Media File Servers," Proc. of ACM Multimedia '97, Seattle, Washington (1997).
Office Action (5 pgs.) dated May 22, 2009 issued in corresponding Chinese Application No. 200580009650.1 with an at least partial English-language translation thereof.
English-language translation of Notice of Reasons for Rejection dated Apr. 1, 2010, issued in corresponding Japanese Application No. 2007-504458.
English-language translation of Decision of Rejection dated Dec. 20, 2010 issued in corresponding Japanese Application No. 2007-504458.
International Search Report, Appln. No. PCT/GB2004/003331, dated Sep. 28, 2004.
UK Search Report, Appln. No. GB 0319251.5, dated Dec. 16, 2003.
Office Action issued in European Appln. No. 05718057.2, dated Oct. 18, 2007.
International Search Report for PCT/GB2008/001069 mailed Nov. 4, 2008.
Written Opinion for PCT/GB2008/001069 mailed Nov. 4, 2008.
UK Search Report dated Aug. 9, 2007 in GB0706424.9.
"Analysis of a Bandwidth Allocation Strategy for Proportional Streaming Services," E-Commerce Technology, 2004, CEC 2004, Proceedings, IEEE International Conference in San Diego, CA, USA Jul. 6-9, 2004, Piscataway, NJ, USA, Zhou & Xu, pp. 373-376, ISBN 0-7695-2098-7, XP010714145.
Balakrishnan, H., Devadas, S., Ehlert, D. and Arvind, "Rate Guarantees and Overload Protection in Input Queued Switches," INFOCOM 2004, Twenty-third AnnualJoint Conference of the IEEE Computer and Communications Societies Hong Kong, PR China Mar. 7-11, 2004, Piscataway, NJ, USA, INFOCOM 2004, Twenty-third AnnualJoint Conference of the IEEE, pp. 2185-2195, vol. 4, ISBN 0-7803-8355-9, XP010740588.
Karczewicz et al. "A Proposal for SP-Frames", document VCEG-L-27, ITU-T Video Coding Experts Group Meeting, Eibsee, Germany, Jan. 9-12, 2001.
Karczewicz et al, "SP-Frame Demonstrations", document VCEG-N42, ITU-T Video Coding Experts Group Meeting, Santa Barbara, CA, USA, Sep. 24-27, 2001.
Dapeng Wu et al, "Streaming Video Over Internet: Approaches and Directions", IEEE Transactions on Circuits and Systems for Video Technology, vol. 11, No. 3, Mar. 2001.
Conklin et al., "Video Coding for Streaming Media Delivery on the Internet", IEEE Transactions on Circuits and Systems for Video Technology, vol. 11, No. 3, Mar. 2001.
Jammeh et al., "Transporting Real Time Transcoded Video over Internet Using End to End Control", PV2002, Apr. 2002.
Cai et al., "Rate-Reduction Transcoding Design for Video Streaming Applications", PV 2002, Apr. 2002.
Rejaie et al, "Layered Quality Adaptation for Internet Video Streaming", IEEE Journal on Selected Areas in Communications, vol. 18, No. 12, Dec. 2000.
Feamster et al, "On the Interaction Between Layered Quality Adaptation and Congestion Control for Streaming Video", PV2001, Apr. 2001.
Licandro et al, A Rate/Quality Controlled MPEG Video Transmission System in a TCP-Friendly Internet Scenario, PV 2002, Apr. 2002.
Active IETF Working Groups, Nov. 20, 2006, http://www.ietf.org/html.charters/wg-dir.html#TransportArea, 11 pages.
Differentiated Services (diffserv), http://www.ietf.org/html.charters/diffserv-charter.html, Sep. 9, 2009, 3 pages.
Multiprotocol Label Switching (mpls), http:/www.ietf.org/html.charters/mpls-charter.html, Mar. 24, 2006, 4 pages.
Resource Reservation Setup Protocol (rsvp), http://www.ietf.org/html.charters/rsvp-charter.html, Mar. 30, 2001, 2 pages.
Integrated Services (intserv), http://www.ietf.org/html.charters/intserv-charter.html, Sep. 5, 2000, 3 pages.
Blake et al., "An Architecture for Differentiated Services", in RFC-2475, Dec. 1998.
Braden et al, "Integrated Service in Internet Architecture: An Overview", in RFC-1633, Jun. 1994.
Mitzel et al, "A Study of Reservation Dynamics in Integrated Services Packet Networks", in Proceedings of the Conference on Computer Communications (IEEE INFOCOM 1996), p. 871-879, Mar. 1996.
Foster et al., "A Quality of Service Architecture that Combines Resource Reservation and Application Adaptation", IWQOS2000, Jun. 2000.
Lu et al., "Understanding Video Qaulity and its Use in Feedback Control", PV 2002, Pittsburgh, Pennsylvania, USA, Apr. 24-26, 2002.
Yang et al., "Rate Control for VBR Video over ATM: Simplification and Implementation", IEEE Transactions on Circuits and Systems for Video Technology, vol. 11, No. 9, Sep. 2001.
Reed et al., "Constrained Bit-Rate control for Very Low Bit-Rate Streaming-Video Applications", IEEE Transaction on Circuits and Systems for Video Technology, vol. 11, No. 7, Jul. 2001.
Furini et al., "Real-Time Traffic Transmissions over the Internet", IEE Transactions on Multimedia, vol. 3, No. 1, Mar. 2001, pp. 33-40,XP002273256.
Chang et al., "Dynamic Window-based Traffic-Smoothing for Optimal Delivery of Online VBR Media Streams", Parallel and Distributed Systems, 2000, Los Alamitos, CA, USA, IEEE Comput.Soc. US, Jul. 4, 2000, pp. 127-134, XP0101504391.
Assuncao et al., "Transcoding of Single-Layer MPEG Video Into Lower Rates", IEE Proceedings;Vision, Image and Signal Processing, Institution of Electrical Engineers, GB, vol. 144, No. 6, Dec. 19, 1997, pp. 377-383, XP006009073.

(56) References Cited

OTHER PUBLICATIONS

Karczewica et al:, "The SP- and SI-Frames Design for H.264/AVC", IEEE Transactions on Circuits and Systems for Video Technology, IEEE Inc., New York, US, vol. 13, No. 7, Jul. 2003, pp. 637-644, XP001051192.
Braden et al, "Resource ReSerVation Protocol (RSVP)", in RFC-2205, Sep. 1997.
Ng, "A Reserved Bandwidth Video Smoothing Algorithm for MPEG Transmission", The Journal of Systems and Software 48 (1999), pp. 233-245.
Salehi et al., "Supporting Stored Video: Reducing Rate Variability and End-to-End Resource Requirements through Optimal Smoothing", Technical Report: UM-CS-1995-098, University of Massachusetts 1995.
International Search Report for PCT/GB2010/000166, mailed Nov. 5, 2010.
Ely, D. et al., "Robust Congestion Signaling", International Conference on Network Protocols 2001 Institute of Electrical and Electronics Engineers Computer Society US, [Online] (Nov. 11, 2001), pp. 332-341.
Spring, D. et al., "Robust Explicit Congestion Notification (ECN) Signaling with Nonces", Ely University of Washington N., (Jun. 1, 2003), pp. 1-3.
Ramakrishnan, TeraOptic Networks; S. Floyd, Aciri; D. Black, EMC; "The Addition of Explicit Congestion Notification (ECN) to IP", IETF Standard, Internet Engineering Task Force, Sep. 1, 2001.
International Search Report mailed Mar. 11, 2004 in International Application No. PCT/GB03/04996 (2 pages).
International Search Report mailed May 20, 2005 in International Application No. PCT/GB2005/001011 ( 5 pages).
UK Search Report dated Aug. 3, 2004 in Application No. GB 0406901.9 (1 page).
International Search Report published Dec. 23, 2010 in International Application No. PCT/GB2010/000163 (4 pages).
Office Action (15 pgs.) dated Feb. 19, 2013 issued in co-pending U.S. Appl. No. 12/921,538.
Office Action (17 pgs.) dated Oct. 11, 2013 issued in co-pending U.S. Appl. No. 12/921,538.
Multiple bitstream switching for video streaming in monotonically decreasing rate schedules, by Alam, Khan and Ghanbari IEEE International Conference on Industrial Technology 2006, Dec. 15-17, 2006, pp. 973-978.
Mulroy, P. et al . . . "The Use of MULTCP for the Delivery of Equitable Quality Video", BT Innovate, Broadband Applications Research Centre, Ipswich, UK, 2009 (9 pgs.).
Crabtree et al., "Equitable Quality Video Streaming", Consumer Communications and Networking Conference, 2009, CCNC 2009, 6th IEEE, Piscataway, NJ, Jan. 10, 2009, pp. 1-5.
Notice of Allowance (9 pgs.) dated Nov. 13, 2014 issued in co-pending U.S. Appl. No. 13/201,261.
Office Action (22 pgs.) dated Aug. 15, 2014 issued in co-pending U.S. Appl. No. 13/133,757.

\* cited by examiner

VIDEO CODING

This application is the U.S. national phase of International Application No. PCT/GB2009/000543 filed 27 Feb. 2009, which designated the U.S. and claims priority to European Application No. 08250815.1, filed 11 Mar. 2008, the entire contents of each of which are hereby incorporated by reference.

BACKGROUND AND SUMMARY

The present invention is concerned with video coding. The present invention is defined in the claims.

BRIEF DESCRIPTION OF THE DRAWINGS

Some embodiments of the invention will now be described with reference to the accompanying drawings, in which.

DETAILED DESCRIPTION OF PRESENT EXAMPLE EMBODIMENTS

Figure 1:
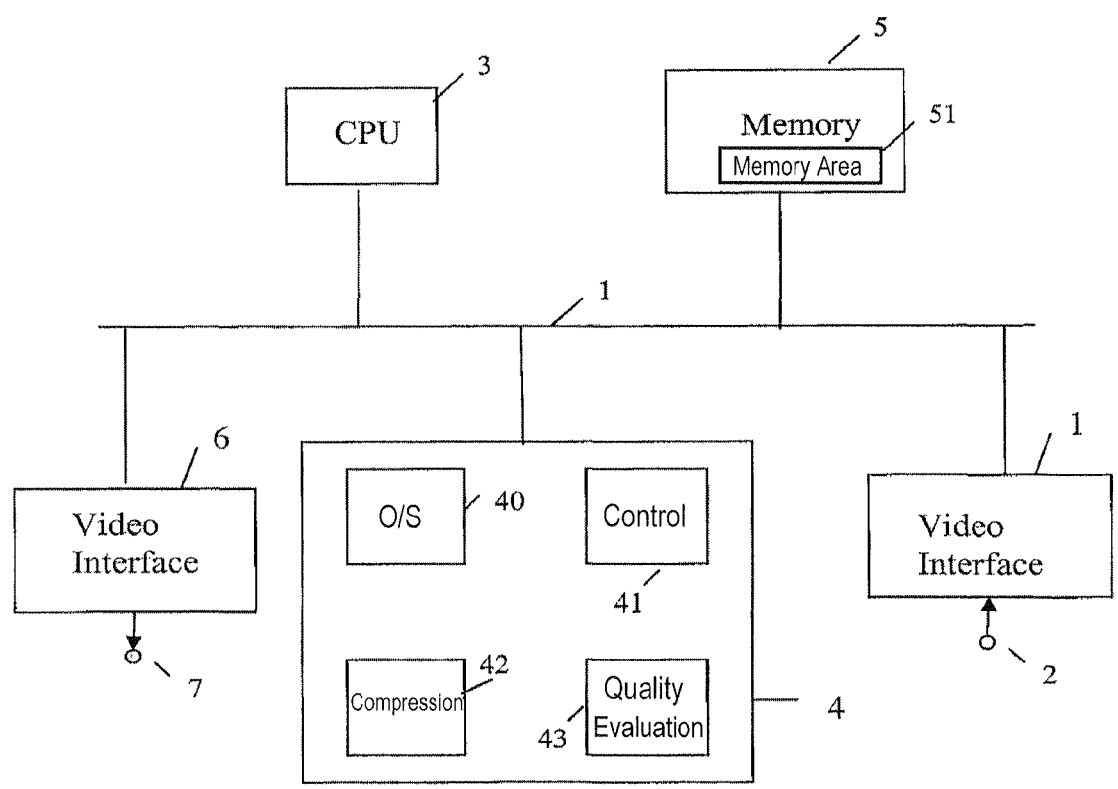
FIG. 1 is a block diagram of a video coder.

The apparatus shown in FIG. 1 comprises a video interface 1 that receives digitally coded video signals, in uncompressed form, at a video input 2. A processor 3 operates under control of programs stored in disc storage 4 and has access to memory 5 and a video output buffer 6 that feeds a video output 7. The memory 5 includes a memory area 51 for temporary storage of picture parameters. The programs include a general purpose operating system 40 and video coding software which implements one of more of the coding methods shortly to be described. This software comprises several programs (or groups of programs), namely control software 41;

compression software 42: in this example the compression software implements a coding algorithm compliant with the ITU H.264 standard;

perceptual quality evaluation software 43.

A video coding method according to a first version of the invention will be described with reference to the flowchart of FIG. 2. Firstly, however, the principles of operation will be explained.

The objective of the method is to code the video signals with constant quality. In principle we envisage coding each picture in such a way that the value of a quality parameter for that picture is equal to a target value for the quality parameter, or at least, such as to tend to reduce deviations from that target. We may specify a single target value that remains fixed, or if desired one may specify different target values for different pictures: for example in H.264 one might specify one target value for intra-coded pictures (I-picture), another for pictures coded using forward prediction (P-pictures) and a third for bidirectionally-coded pictures (B-pictures). It is also possible that one may wish to change the target value to accommodate the characteristics of some external system, for example a part of a congestion control mechanism. We prefer to use a perceptual quality measure, that is to say, a measure which takes account of masking effects.

The quality is controlled by providing that the coding algorithm has at least one variable parameter that influences the quality of the decoded picture—in this example it is the quantiser index. In H.264 the relationship between the quantiser index QP and the scaled quantiser step size QSS is given, for picture k, by $$QSS(k) = 2^{QP(k)/6} \qquad (1)$$

Thus, the primary task of the control software 41 is to estimate a value for QP that would, were the quality of the decoded picture to be measured, result in a value for the quality measurement parameter that is equal, or close to, the target value. Whilst it would in principle be possible to determine this by coding the picture using a variety of different values of quantiser index, decoding the picture and computing the value of the quality measurement parameter of the decoded picture, we prefer to estimate QP from a known relationship among QP, the value of the quality measurement parameter, and a masking term.

One such relationship is described in our co-pending international patent application no. WO2007/066066. In that method, a quality measure was based on the quantiser step size parameter, and a measure of spatial complexity of the decoded picture. More specifically, in the case of an H.264 signal, a decoder delivered for each picture (a) a quantiser step size parameter $Q(i,j)$ ($i=0, \ldots, M_x-1$; $j=0 \ldots M_y-1$) for each macroblock $i,j$;

(b) a decoded brightness value $D(x,y)$ ($x=0, \ldots, P_x-1$; $y=0, \ldots, P_y-1$) for each pixel $x,y$.

A picture-averaged quantiser step size QPF was computed:

$$QPF = \frac{1}{M_x M_y} \sum_{i=0}^{M_x-1} \sum_{j=0}^{M_y-1} Q(i,j) \qquad (2)$$

As a masking measure, a contrast measure was used, representative of the difference between the average brightness over a small horizontal window of width H and that over a similar horizontally adjacent window:

$$C_h = \frac{1}{H} \left| \sum_{u=0}^{H-1} D(x-u, y) - \sum_{u=0}^{H-1} D(x+u+1, y) \right| \qquad (3)$$

and similarly in the vertical direction:

$$C_v = \frac{1}{V} \left| \sum_{v=0}^{V-1} D(x, y-v) - \sum_{v=0}^{V-1} D(x, y+v+1) \right| \qquad (4)$$

where V is the vertical window height, these two measures being combined so that the larger takes effect:

$$C_{hv} = \text{Max}(C_h, C_v) \qquad (5)$$

A picture-averaged contrast measure CS was computed:

$$CS = \frac{1}{P_x - 2H + 1} \cdot \frac{1}{P_y - 2V + 1} \cdot \sum_{x=H-1}^{P_x-H-1} \sum_{y=V-1}^{P_y-V-1} C_{hv}(x,y) \qquad (6)$$

These two quantities were then time averaged over the time interval for which the MOS estimate is required: in the present case of course this is not required as the interval is that of a single picture.

The quality measure iMOS (instantaneous mean opinion score) is then formed as a weighted sum of these, using weighting factors obtained by regression analysis of training sequences of known subjective quality.

$$iMOS = -0.135 \times QPF + 0.04 \times CS + 7.442 \quad (7)$$

This result was clamped to the range 0 to 5:

$$\text{if } (iMOS > 5) \text{ then } iMOS = 5 \quad (8)$$

$$\text{if } (iMOS < 0) \text{ then } iMOS = 0 \quad (9)$$

In the present case, the target value $T_{iMOS}$ is specified, and we require to calculate QP. One option would be to invert the linear relationship of Equation (7), viz.:

$$QPF = \frac{0.04 \times CS + 7.442 - T_{iMOS}}{0.135} \quad (10)$$

$T_{iMOS}$ is in the range 0 to 5 and is not necessarily an integer (and in most instances will not be).

We prefer, however, to use a nonlinear model, and have chosen a quadratic representation. Other nonlinear representations are possible; for example, a relationship containing linear and logarithmic functions of the quantiser index has been tried, and could be used provided one is prepared to use numerical methods for solving it. The quadratic model is:

$$iMOS = aQP^2 + bQP + c_1C + c_2 \quad [11]$$

Empirical values for the constants, obtained by analysing the results of subjective tests on decoded pictures obtained from coded training sequences of video are $a=-00503$; $b=0.1742$; $c_1=0.072$; $c_2=2.649$. Note that the masking measure C is calculated slightly differently from CS (though the latter could also be used if desired). The quadratic model has the advantage that it has an analytical solution so that the value of QP for a quality equal to the target can be obtained by application of the usual formula for solution of quadratic equations, giving:

$$QP = \frac{-b - \sqrt{b^2 - 4a(c_1C + c_2 - T_{iMOS})}}{2a} \quad [12]$$

The contrast measure C is a measure of the masking capability of the picture and is calculated as follows. For each luminance pixel, a block of 8 pixels to the left of the pixel is considered and the average is calculated. The pixel's contrast is set to the absolute value of the difference between this average and the pixel value. Using the same notation as above, then this gives $$C(x, y) = \left| D(x, y) - \frac{1}{H} \sum_{u=1}^{H} D(x-u, y) \right| \quad [13]$$

where in this example the block length H=8.

The average contrast for the whole picture is calculated as the average of the contrast values for the pixels whose blocks remain within the picture area when calculating the individual pixel contrast values:

$$C = \frac{1}{P_x - 8} \cdot \frac{1}{P_y} \cdot \sum_{y=0}^{P_y - 1} \sum_{x=8}^{P_x - 1} \left| D(x, y) - \frac{1}{H} \sum_{u=1}^{H} D(x-u, y) \right| \quad [14]$$

In the system described in our earlier patent application, the contrast measure was obtained from the pixels $D(x,y)$ of the decoded picture. Here, however, the decoded picture is not available until encoding has been performed and we therefore use the pixel luminance values $A(x,y)$ of the uncoded source picture. The picture averaged contrast measure $C_{SOURCE}$ for the source picture is thus $$C_{SOURCE} = \frac{1}{P_x - 8} \cdot \frac{1}{P_y} \cdot \sum_{y=0}^{P_y - 1} \sum_{x=8}^{P_x - 1} \left| A(x, y) - \frac{1}{H} \sum_{u=1}^{H} A(x-u, y) \right| \quad [15]$$

This value can be used in Equation 12 in place of C. However, whilst if a fine quantiser is used (i.e. with a small quantiser index and step size) the masking effect observed in the decoded picture is much the same as that in the original picture, at coarser quantisations the masking effect will be modified. Therefore in the preferred version of the invention we apply a correction to take account of the fact that the masking effect is modified in dependence on the quantiser index used. Since however the quantiser index is not known in advance, we base this correction on the empirically observed correlation between C, $C_{SOURCE}$ and $T_{iMOS}$:

One method of doing this us to use a linear (or other) model of this:

$$C_{CORR} = \alpha + \beta T_{iMOS} + \gamma C_{SOURCE} \quad [16]$$

where $\alpha=-4$; $\beta=1$; $\gamma=0.9$ are empirical coefficients. These coefficients were estimated by the following procedure:

(i) Seventeen video sequences, covering different types of material, were used, totaling 5958 pictures. These were coded using 32 different quantisation indices ranging from 20 to 51, and decoded. This gave 32 results per picture, but to reduce the amount of data, only one result, with a random QP, was retained for each picture.

(ii) For each of these pictures, the source contrast measure CSOURCE and coded contrast C were calculated in accordance with equations 14 and 15. The quality iMOS was calculated in accordance with equation 11.

Figure 4:
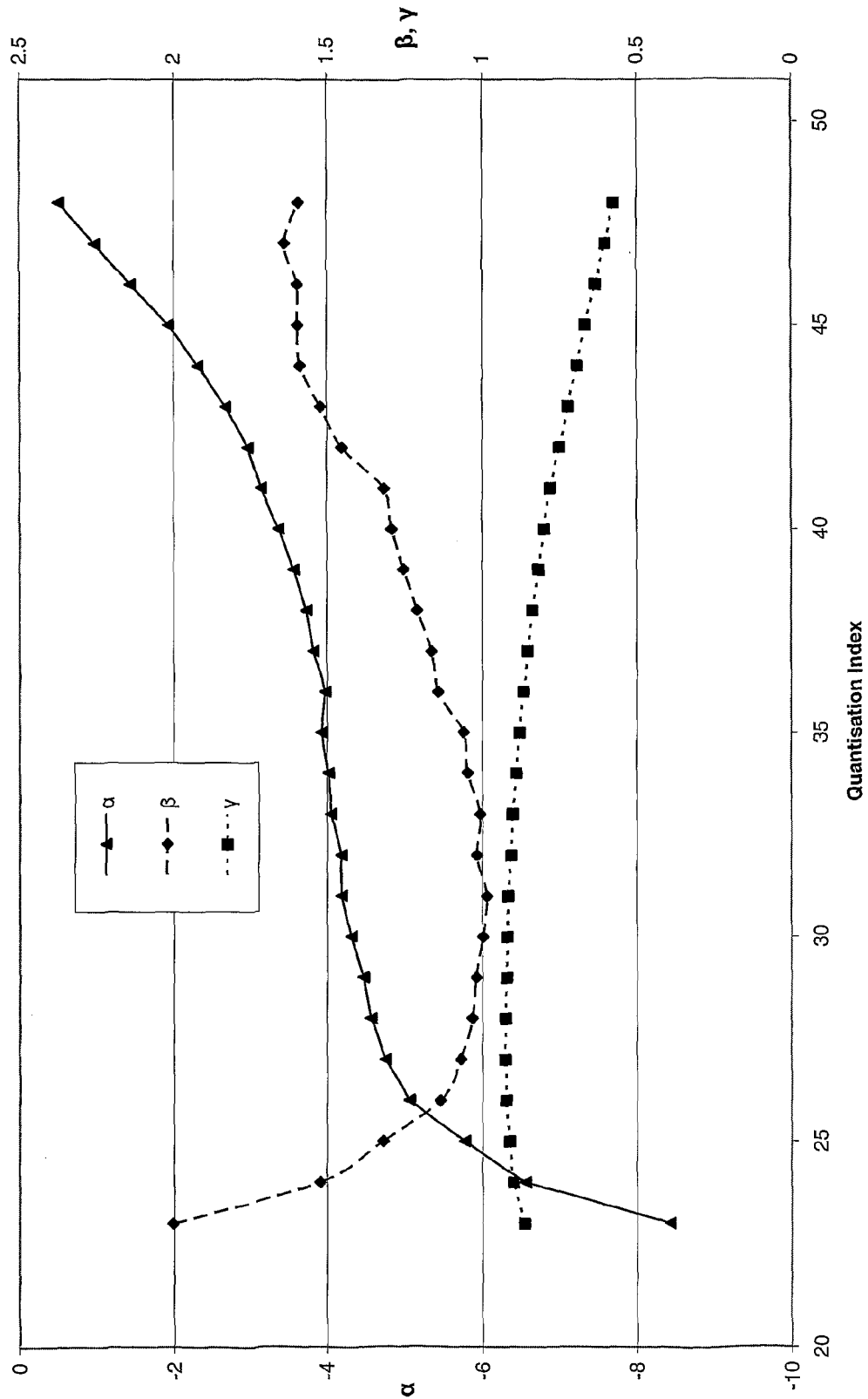
FIG. 4 is a graph showing the derivation of certain parameters.

(iii) It would be possible simply to apply regression techniques to the entire data set to estimate the parameters for equation (16). However, we proceeded by performing 26 separate regression analyses, each for a range of seven values of QP (20 to 26; 21 to 27; etc.). This gave 26 values for the coefficients $\alpha$, $\beta$, $\gamma$ and FIG. 4 is a graph showing these plotted against QP.

(iv) The values chosen are representative values taken from the central region of the graphs.

In practice however, when the (or a) previous picture has already been coded using the same target iMOS, we prefer to use a different approach. When each picture has been decoded, we determine the value of C using Equation (14) and store $T_{iMOS}$ (unless it is always constant), $C_{SOURCE}$ and C. In order to compute $C_{CORR}$ for a new picture, given $C_{SOURCE}$ for the new picture, we use $$C_{CORR} = C_{SOURCE} \frac{C_P(iMOS)}{C_{PSOURCE}(iMOS)} \quad [17]$$

where $C_{PSOURCE}(iMOS)$ and $C_P(iMOS)$ are the source and coded contrast respectively for the previously coded and decoded picture. The previous picture selected for this purpose can be the immediately preceding picture, or (if the immediately preceding picture did not use the same target iMOS) the most recent picture that did use the same target iMOS. By "immediately preceding" and "most recent" we mean, when considered in order of coding; however an alternative would be to select the immediately preceding or most recent picture, considered in display order, of those frames that have already been coded. Note also that a previously coded picture with a target iMOS that is not the same as, but within a small tolerance (say ±0.2); thus it is sufficient that the candidate picture has a similar $T_{iMOS}$ to the new picture (this is also true of the alternative approaches discussed below). Other approaches to this selection will be discussed later. In any case where $C_{PSOURCE}(iMOS)$ and $C_P(iMOS)$ are not available, then the relation of Equation 16 is used instead. Where only a single value for $T_{iMOS}$ is specified, this will be the case only for the first frame. If, in the alternative, $C_{SOURCE}$ is used uncorrected for the first frame to be coded with a specified $T_{iMOS}$, subsequent repeated use of Equation 17 for subsequent frames to be coded with the same $T_{iMOS}$ should gradually reduce errors in the masking correction.

Figure 2:
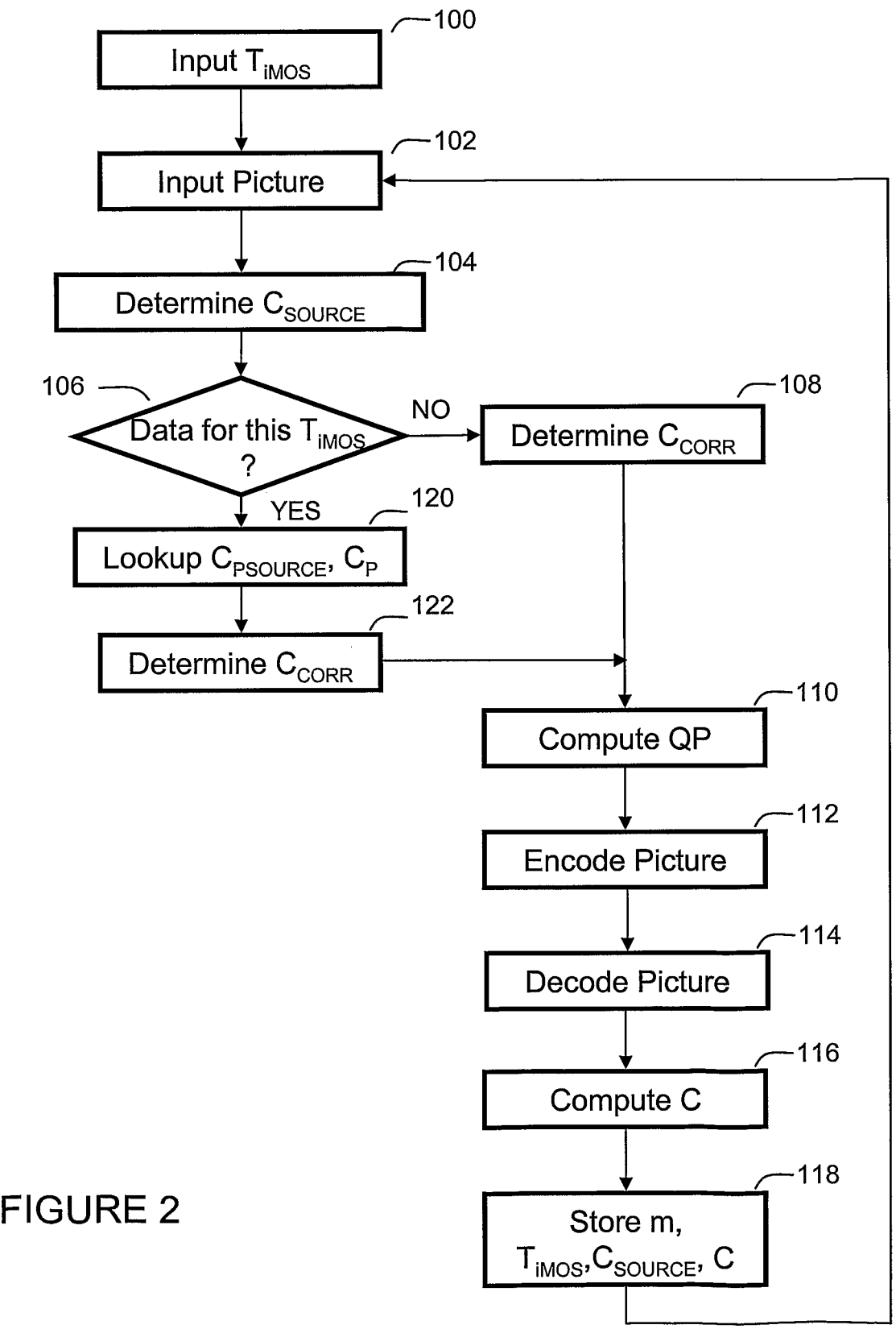
FIGS. 2 and 3 are flowcharts explaining the operation of the coder of FIG. 1.
Figure 3:
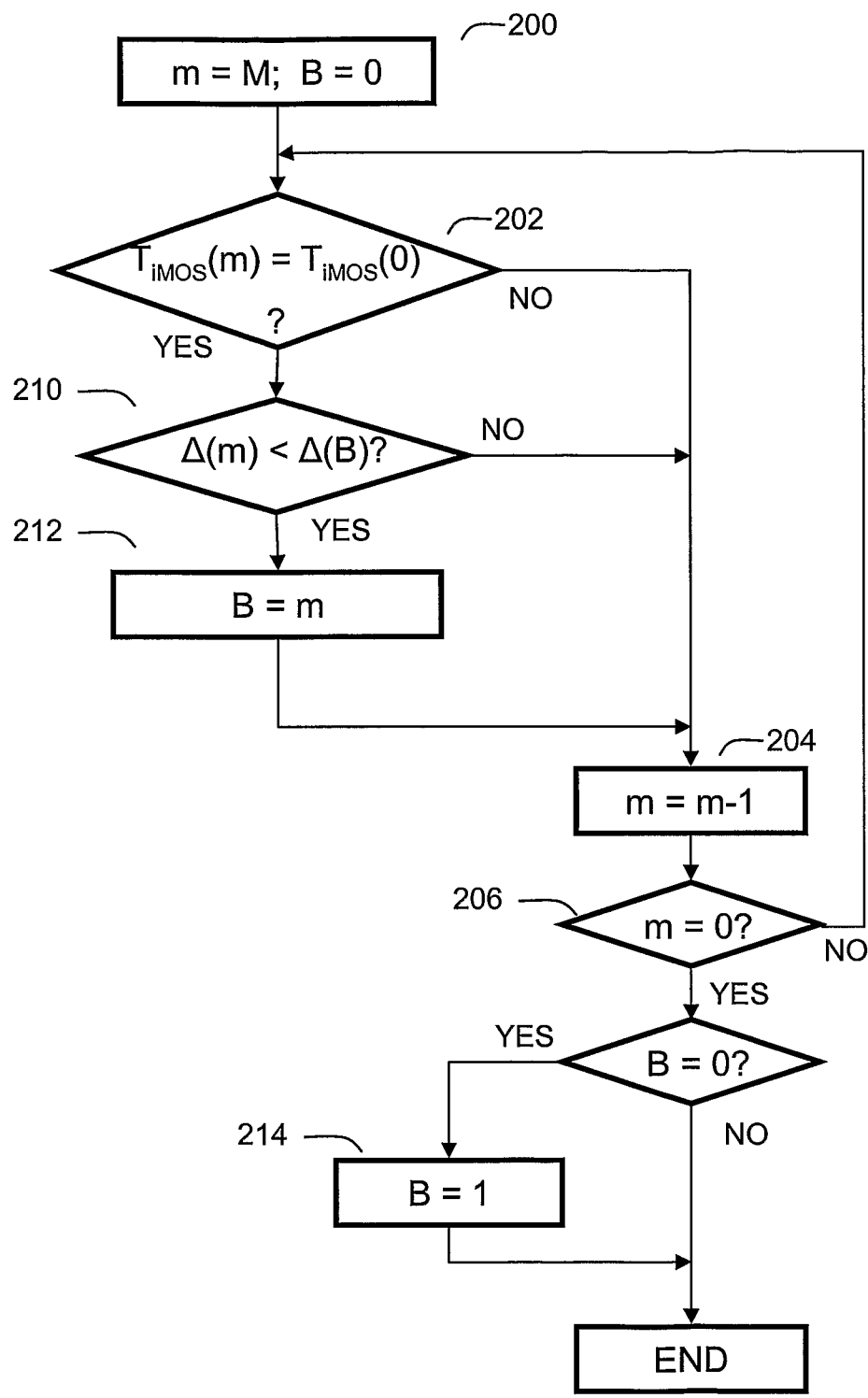

Referring now to FIG. 2, at Step 100, a signal is received stipulating a target value $T_{iMOS}$. At step 102 a digitally coded picture is received at the input 1 and stored in the memory 5. Then (104) the picture is analysed in accordance with Equation (15) to determine $C_{SOURCE}$. At 106 a check is performed as to whether there are stored data in the memory area 51 for the current $T_{iMOS}$. The first time this test is performed there will not be; thus at 108 a masking value $C_{CORR}$ is calculated in accordance with Equation (16). Next, in Step 110, the quantiser index to be used is computed in accordance with equation (12), using $C_{CORR}$ instead of C. Then, at Step 112 the picture is coded using the H.264 software 42 with this quantisation index and sent to the output buffer 6. The coded picture is decoded (114) in accordance with H.264 and then analysed (116) according to Equation (14) to obtain the decoded value for C. At Step 118, various data for the decoded picture the picture number are stored in the memory area 51 for future use. The precise data required will depend on which strategy is in use for determining which previously coded and decoded picture is to be used for applying equation (17). They will include some or all of the following: the picture number in coding order; the picture number in display order; $T_{iMOS}$; $C_{SOURCE}$; C; and picture type (I, P or B).

The process then returns to Step 102 to receive another picture, which is processed in the same way. However, in the event that, at Step 106, it is found that one or more pictures have previously been coded with the current value of $T_{iMOS}$, then, instead of Step 108, the masking value $C_{CORR}$ is obtained at Step 120 by looking up the values of $C_{PSOURCE}(iMOS)$ and $C_P(iMOS)$ for a selected previously coded and decoded picture, and applying Equation (17). Then the process continues from Step 110.

Some selection options for the previously coded and decoded picture to be used at Step 120 have been discussed earlier. Other approaches that take cognisance of the possibility that the most recent picture is not necessarily the most similar to the picture to be coded will now be described. One possibility is to use the most recent (in either sense) picture of the same type; in one example, if the current picture is a B-picture we use the most recent B-picture, if the current picture is P or I picture we use the most recent picture that is not a B picture (in other words, P and I pictures are considered to be of the same "type" for this purpose).

For a BBPBBP coding structure, the first three of these options give the following output, with pictures listed in coding order and numbered in display order.

| Source Picture | Previous Coded Picture | Recent Previous Displayed Picture | Previous Coded Same Type |
|---|---|---|---|
| I2 | | | |
| B0 | I2 | I2 | I2 |
| B1 | B0 | B0 | B0 |
| P5 | B1 | I2 | I2 |
| B3 | P5 | I2 | B1 |
| B4 | B3 | B3 | B3 |
| P8 | B4 | P5 | P5 |
| B6 | P8 | P5 | B4 |
| B7 | B6 | B6 | B6 |
| P11 | B7 | P8 | P8 |
| B9 | P11 | P8 | B7 |
| B10 | B9 | B9 | B9 |
| P14 | B10 | P11 | P11 |

Note that the only difference between "previous output picture" and "previous coded same type" is for the first B picture in each grouping. In the former case the previous picture is the I or P picture coded four periods ago but displayed immediately previously, and in the latter case it is the last B picture of the last grouping, coded and displayed two periods ago.

Another option is to search among the previously coded and decoded pictures to find one that is similar to the picture currently to be coded. Typically this would be over a short time window, of perhaps one second or a few seconds. One possible criterion of similarity for this purpose is to search for a previously coded and decoded picture that has a value for source contrast $C_{SOURCE}$ closest to that of the current picture. The following macro FindSimilar may be used to find the most similar source contrast in the previous R encoded pictures, by comparing the current picture's source contrast with the source contrast of each of the previous R coded pictures.

The implementation of the FindSimilar macro is shown below, where r is the picture number, the first picture being coded with the specified $T_{iMOS}$ having r=1.

```
Sub FindSimilar( )
    current = csource(r)
    best_r = r − 1
    best_error = abs(current − csource(best_r))
    for other_r = r − 2 TO r − R step −1
        if (other_r >= 6) then
            this_error = abs(current − csource(other_r))
            if (this_error < best_error) then
                best_r = other_r
                best_error = this_error
            end if
        end if
    next other_r
    result = best_r
next row
End Sub
```

Another option for finding the most similar recent picture is to actually compare the pictures themselves—though this is much more demanding on processing power. If this option is used, it is necessary to have access to these pictures, so unless the pictures are already available (for example if the entire sequence to be coded is already stored on the disc 4), then Step 118 would need to store also the entire picture.

We suppose that there are M pictures in the buffer. The current picture is referred to as picture zero, the most recently coded picture is picture 1 and the oldest is picture M. At Step 200, a pointer m is set to M. B, which is to contain the number of the picture that best matches the current one, is set to zero.

At Step 202, the stored $T_{iMOS}$ for frame m is compared with that for the current picture and if they are unequal, m is decremented at Step 204 and the process repeated from step 202, unless (206) all the stored pictures have been examined, in which case the process terminates.

If a match occurs at Step 202 picture m is compared (210) with the current picture to obtain the sum of absolute differences $\Delta(m)$:

$$\Delta(m) = \sum_{y=0}^{P_y-1} \sum_{x=0}^{P_x-1} |A_m(x, y) - A_0(x, y)| \quad (18)$$

If this is less that the sum of absolute differences $\Delta(B)$ obtained for the best picture so far, then at Step 212, B is set equal to m. Either way the process then proceeds to Step 204.

Upon exit at Step 206, the pointer B will contain the picture number m for the picture that has the best match with the current one, and this one is chosen. The only exception is when there are no previously coded pictures with the same target iMOS as the current one. Then B=0 and is set to 1 (step 214) so that the immediately preceding picture is chosen by default.

If desired, these search methods could be limited to searching for a picture of the same type (B or I/P) as the current one.

We have discussed a number of methods of selecting a previously coded and decoded picture. One may also use a combination of the different methods. One preferred method, shown in the code below, is as follows. First, consider the previous picture of the same type (i.e. B or non-B), and if the source contrast of that picture is similar to the current, then use it. Otherwise, consider the previous picture of the other type (non-B or B respectively), and if the source contrast of that picture is similar to the current (i.e. within a defined tolerance of—say ±20%), then use it. Otherwise, if the source contrast of either of these previous pictures is similar to that of the current picture (with a wider tolerance—e.g. ±50%), choose the most similar (i.e. with the source contrast that is closest to that of the current picture). (Note that the tolerances used below are slightly different; the criterion used for comparing two contrasts is that they are deemed similar if the ratio of the larger to the smaller is less that 1.25 (or 2.0 for the wider tolerance). Otherwise use the (single frame) method of equation 16.

| Initialisation code |
|---|
| // Set the following to an arbitrary large negative number to show that they are not valid<br>    CurrentSourceContrast = −100.0;<br>    PreviousPSourceContrast = −100.0;<br>    PreviousBSourceContrast = −100.0;<br>    PreviousPCodedContrast = −100.0;<br>    PreviousBCodedContrast = −100.0; |

Per picture code (only shown for B pictures, similar code in an else statement for I/P pictures). Note "break" means jump out of the "while" loop, which is not actually a loop but a means to avoid unfashionable "goto" statements.

```
if (H264_B_SLICE == m_SliceType)
{
    while (true)
    {
        double b_ratio = 0.001;
        double p_ratio = 0.001;
        if (PreviousBSourceContrast > 0.0)
        {
            b_ratio = CurrentSourceContrast / PreviousBSourceContrast;
            if ((b_ratio <= 1.25) && (b_ratio >= 0.8))
            {
                // Previous B source contrast is
 calculated, and current source contrast is similar.
                // Assume that the ratio of contrast of the
 current coded B frame to source frame will
                // be the same as for the previous B frame
                pqos_contrast = b_ratio * PreviousBCodedContrast;
                break;
            }
        }
        if (PreviousPSourceContrast > 0.0)
        {
            p_ratio = CurrentSourceContrast / PreviousPSourceContrast;
            if ((p_ratio <= 1.25) && (p_ratio >= 0.8))
            {
                // Previous P source contrast is
 calculated, and current source contrast is similar.
                // Assume that the ratio of contrast of the
 current coded B frame to source frame will
                // be the same as for the previous P frame
                pqos_contrast = p_ratio * PreviousPCodedContrast;
                break;
            }
        }
        if (((b_ratio <= 2.0) && (b_ratio >= 0.5)) || ((p_ratio <= 2.0) && (p_ratio >= 0.5)))
        {
            // At least one of the ratios is within a factor
 of two, so use the better one
            if ((b_ratio + (1.0 / b_ratio)) < (p_ratio + (1.0 / p_ratio)))
            {
                pqos_contrast = b_ratio * PreviousBCodedContrast;
                break;
            }
            else
            {
                pqos_contrast = p_ratio * PreviousPCodedContrast;
                break;
            }
        }
        // Conclude that the previous frames' contrast is too
 different from the current frame's to be useful,
        // so use an intra-frame method instead
        pqos_contrast = target_imos + (0.9 * CurrentSourceContrast) − 4.0;
        break;
    }
} // END OF: if (H264_B_SLICE == m_SliceType)
```

Variations

It was mentioned above that the coding algorithm to be used has at least one variable parameter, and the quantisation index was given as an example. It is also possible to vary the coding by reducing the spatial resolution, as by subsampling or by discarding transform coefficients.

The H.264 standard permits different macroblocks (16×16 pixels) within a picture to be assigned different quantiser stepsizes. If desired, the processes described above for determining the quantiser index to be used for a picture could equally well be applied to a part of a picture such as an individual macroblock separately. This could be done even if the same target quality were specified for the whole picture, as it could still result in different quantiser indices for the different macroblocks, if the masking effects vary. Also it admits of the possibility of specifying different target values for different macroblocks (e.g. for an intra-macroblock or a inter-macroblock). Indeed, this could be done on a macroblock-by macroblock basis even if the masking is estimated only for the whole picture.

Also, the selection could be made on some other criterion, such as based on focus of attention: parts of the picture the viewer is not going to focus on do not need to be coded as well as the areas of interest where he will be focussed. Region-of-interest coding is discussed in D. Agrafiotis, S. J. C. Davies, N. Canagarajah and D. R. Bull, "Towards efficient context-specific video coding based on gaze-tracking analysis", *ACM Transactions on Multimedia Computing, Communications, and Applications (TOMCCAP)*, Volume 3, Issue 4 (December 2007); Crabtree, B. "Video compression using focus of attention", *Proceedings of the Picture Coding Symposium*, China 2006; and our international patent application no WO01/61648.

It is also possible to apply different quantiser step sizes to different coefficients within a macroblock. A quantisation index is specified and then adjusted for different coefficients by application of a matrix. This is described in detail in the MPEG2 and H.264 standards.

It will often arise the value for the quantisation index obtained by the use of Equation (12) is not an integer. For many purposes it will be sufficient simply to round this to the nearest integer. However, in the event that it is desired to achieve an average quantisation index over the picture that is equal to the non-integer value obtained, one may proceed as follows. A macroblock is a 16×16 picture area. It is the smallest area of picture that can have an independent value of quantisation index. If the value of average_quantiser calculated at the start of the picture (i.e. QP) is an integer, then all that is needed at this point is to set the quantiser index for each macroblock to this integer value. If it is not an integer, such as 32.5, then it is necessary to vary the quantiser index for each macroblock. In this case there are many ways that this could be done, for example to use 32 for the top of the picture and 33 for the bottom. However, such a strategy may have visible effects as the top of the picture may look better than the bottom. An alternative is to alternate 32, 33, 32, 33 etc.

However, this alternating pattern also has problems. When a macroblock is skipped (not coded), no information is present in the encoded bitstream for the macroblock, and it is not possible to change the quantisation index. Hence if the second macroblock were skipped, then setting the quantisation index to 32, 33, 32, 33, would result in the pattern 32, 32, 32, 33 being received at the decoder, and the average value would be calculated as 32.25 not 32.5 as planned.

So it is necessary to keep track of the values of quantisation index that the decoder would decode from the bitstream, and ensure that the average value at the decoder was as intended.

The following pseudo-code shows how this was implemented.

Set total_number_of_macroblocks to the total number in the picture
Set number_of_macroblocks_left to the number still to be encoded
Set total_quantiser to the sum of quantiser indices so far in the picture
Set quantiser_remainder to zero
average_quantiser_from_here = (total_number_of_macroblocks * average_quantiser − total_quantiser) / number_of_macroblocks_left this_quant = (int) (average_quantiser_from_here + quantiser_remainder + 0.5)
Clip this_quant to +/− 3 from average_quantiser to prevent extreme values towards the end of the picture.
quantiser_remainder = quantiser_remainder + average_quantiser_from_here − this_quant

What is claimed is:

1. A method of video coding using a coding algorithm having a variable parameter influencing the quality of the coding, wherein the video to be coded comprises a plurality of pictures, the method comprising specifying at least one target value for a quality measurement parameter, so that each picture or part of a picture has said at least one target value;
for each picture area to be coded, where a picture area is a picture or part of a picture, performing, in a single pass of the method of video coding, the steps of:
estimating, independently of the other pictures, a value for said variable parameter based on (a) the target value for that picture area and (b) a perceptual masking measure dependent on the picture content of the picture area, in accordance with a predetermined relationship between (a) and (b), wherein the other pictures comprises one or more of the pictures other than the picture area being coded; and
coding the picture area using the estimated value.

2. A method according to claim 1 in which the perceptual masking measure is generated, before coding the picture area, from pixel values of the picture to be coded.

3. A method according to claim 2 in which the perceptual masking measure is a measure of spatial complexity of the picture area.

4. A method according to claim 2 in which the perceptual masking measure is generated, before coding the picture area, by deriving a source masking measure from pixel values of the picture to be coded and modifying this measure in accordance with an estimate of the effect of the coding algorithm upon the degree of masking.

5. A method according to claim 4 in which the perceptual masking measure is a function of a) the source masking measure and b) the target value of the quality measurement parameter for that picture area.

6. A method according to claim 3 comprising, after coding a picture:
generating a decoded version of the picture;
determining a perceptual masking measure for the decoded picture;
storing either (a) the perceptual masking measure for the decoded picture and the perceptual masking measure for the source picture or (b) data indicative of the relationship between the perceptual masking measure for the decoded picture and the perceptual masking measure for the source picture;
and wherein the step of modifying the source perceptual masking measure for a picture area to be coded (other than the first) comprises scaling the perceptual measure in accordance with the relationship between the perceptual masking measure for a previously coded and decoded picture that was coded using the same, or a similar, target value of quality measurement parameter as the picture to be coded and the source perceptual masking measure for the same previously coded and decoded picture.

7. A method according to claim 6 in which said relationship is the ratio of the perceptual masking measure for a previously coded and decoded picture and the source perceptual masking measure for the same previously coded and decoded picture.

8. A method according to claim 6 in which the previously coded and decoded picture is the most recent (considered in the order in which the pictures are coded) picture of a set of pictures that were coded with the same, or a similar, target value as the picture being coded.

9. A method according to claim 6 in which the previously coded and decoded picture is the most recent (considered in the order in which the pictures are to be displayed) picture of a set of pictures that were coded with the same, or a similar, target value as the picture being coded.

10. A method according to claim 6 further including
    comparing the picture to be coded with a set of pictures that have previously been coded; and
    selecting one of the previously coded pictures that has a high similarity to the picture being coded;
    wherein the relationship used for scaling of the source perceptual masking measure for the picture being coded is that of the selected picture.

11. A method according to claim 10 in which the degree of similarity between the picture being coded and a previously coded picture is determined by comparing the source perceptual masking measures of the two pictures.

12. A method according to claim 10 in which the degree of similarity between the picture being coded and a previously coded picture is determined by comparing pixel values of the two pictures.

13. A method according to claim 8 in which the set of pictures is a predetermined number of pictures, being the most recent pictures that were coded with the same, or a similar, target value as the picture being coded.

14. A method according to claim 8 in which the set of pictures is a predetermined number of pictures, being a selection from the most recent pictures that were coded with the same, or a similar, target value as the picture being coded, the selection being based on the prediction type of the picture being coded.

15. A method according to claim 14 in which in the event that the picture to be coded is to be coded using bidirectional prediction, the set of pictures consists of pictures that were coded using bidirectional prediction and in the event that the picture to be coded is to be coded without using bidirectional prediction, the set of pictures consists of pictures that were coded without using bidirectional prediction.

16. A method according to claim 1 in which the variable parameter is a quantisation parameter.

17. A method according to claim 1 in which the predetermined relationship between the variable parameter, the quality metric and the perceptual masking measure is determined by analysis of the results of coding training sequences of video material.

18. A video coder comprising:
    storage memory; and
    a computer processor for performing video coding using a coding algorithm having a variable parameter influencing the quality of the coding, wherein the video to be coded comprises a plurality of pictures, the computer processor configured to at least:
    specify at least one target value for a quality measurement parameter, so that each picture or part of a picture has said at least one target value;
    for each picture area to be coded, where a picture area is a picture or part of a picture, perform, in a single pass of the video coding:
        estimation, independently of the other pictures, of a value for said variable parameter based on (a) the target value for that picture area and (b) a perceptual masking measure dependent on the picture content of the picture area, in accordance with a predetermined relationship between (a) and (b), wherein the other pictures comprises one or more of the pictures other than the picture area being coded; and
        coding of the picture area using the estimated value.

19. A video coder according to claim 18 in which the perceptual masking measure is generated, before coding the picture area, from pixel values of the picture area to be coded.

20. A video coder according to claim 19 in which the perceptual masking measure is a measure of spatial complexity of the picture area.

21. A video coder according to claim 19 in which the perceptual masking measure is generated, before coding the picture area, by deriving a source masking measure from pixel values of the picture to be coded and modifying this measure in accordance with an estimate of the effect of the coding algorithm upon the degree of masking.

* * * * *